(12) United States Patent
Alobaidi et al.

(10) Patent No.: US 12,542,444 B2
(45) Date of Patent: Feb. 3, 2026

(54) POWER SYSTEMS AND METHODS OF USING THE SAME TO DELIVER POWER

(71) Applicant: Green Cubes Technology, LLC, Kokomo, IN (US)

(72) Inventors: Mohammed Alobaidi, Kokomo, IN (US); Anthony Cooper, Kokomo, IN (US); Patrick Ney, Wakefield, MA (US); Joseph Richards, Kokomo, IN (US)

(73) Assignee: Green Cubes Technology, LLC, Kokomo, IN (US)

( * ) Notice: Subject to any disclaimer, the term of this patent is extended or adjusted under 35 U.S.C. 154(b) by 178 days.

(21) Appl. No.: 18/110,092

(22) Filed: Feb. 15, 2023

(65) Prior Publication Data

US 2023/0198269 A1    Jun. 22, 2023

Related U.S. Application Data

(63) Continuation of application No. 17/535,972, filed on Nov. 26, 2021, now Pat. No. 11,588,335, which is a
(Continued)

(51) Int. Cl.
*H02J 7/00*    (2006.01)
*H01M 10/48*    (2006.01)
*H02J 7/34*    (2006.01)

(52) U.S. Cl.
CPC .......... *H02J 7/0013* (2013.01); *H01M 10/48* (2013.01); *H02J 7/0029* (2013.01); *H02J 7/0042* (2013.01); *H02J 7/345* (2013.01)

(58) Field of Classification Search
CPC ...... H02J 7/0013; H02J 7/0029; H02J 7/0042; H02J 7/345; H02J 1/001; H02J 7/34;
(Continued)

(56) References Cited

U.S. PATENT DOCUMENTS 5,557,188 A    9/1996    Piercey
10,637,280 B2 *    4/2020    Destenaves ........... G06F 1/1635
(Continued)

FOREIGN PATENT DOCUMENTS

EP    2842195 A1    3/2015

OTHER PUBLICATIONS

PCT/US2018/050038, International Search Report and Written Opinion of the Internal Search Authority, Nov. 26, 2018.
(Continued)

*Primary Examiner* — Ryan Jager
(74) *Attorney, Agent, or Firm* — Reichel Stohry Dean LLP; Mark C. Reichel; Natalie J. Dean

(57) ABSTRACT

Power systems and methods of using the same to deliver power. A power system referenced herein can include a housing capable of attaching to a workstation, one or more cradles or mounting fixtures to receive at least one energy storage device, electronic circuitry to communicate status of the at least one energy storage device, state of charge of the at least one energy storage device, and/or overall health of the at least one energy storage device, and one or more electrical connectors to allow the at least one energy storage device to charge and/or discharge and communicate with the electronic circuitry, with said housing having an internal power supply and charge circuitry, said power supply capable of receiving input power from an external AC or DC power source; wherein the power system is configured to deliver power to the workstation.

20 Claims, 3 Drawing Sheets

Related U.S. Application Data continuation of application No. 16/645,766, filed as application No. PCT/US2018/050038 on Sep. 7, 2018, now Pat. No. 11,211,802.

(60) Provisional application No. 62/555,279, filed on Sep. 7, 2017.

(58) Field of Classification Search
CPC .. H02J 1/102; H02J 1/10; Y02E 60/10; G06F 1/188; G06F 1/20; G06F 1/26; H01M 10/48
USPC .......................................................... 307/19
See application file for complete search history.

(56) References Cited

U.S. PATENT DOCUMENTS

| | | | | |
|---|---|---|---|---|
| 11,211,802 B2* | 12/2021 | Cooper | ................. | H02J 7/0042 |
| 11,588,335 B2* | 2/2023 | Alobaidi | ............... | H01M 10/48 |
| 2003/0193245 A1 | 10/2003 | Powers | | |
| 2005/0206165 A1 | 9/2005 | Yang | | |
| 2007/0055116 A1 | 3/2007 | Clark | | |
| 2007/0227409 A1* | 10/2007 | Chu | ....................... | A47B 21/00 |
| | | | | 108/50.02 |
| 2007/0228680 A1* | 10/2007 | Reppert | ............... | A61G 12/001 |
| | | | | 280/47.35 |
| 2009/0261656 A1 | 10/2009 | Coonan et al. | | |
| 2009/0268385 A1* | 10/2009 | Harbin | ................ | H01M 50/202 |
| | | | | 361/679.02 |
| 2010/0264738 A1* | 10/2010 | Murtha | .................... | G06F 1/263 |
| | | | | 307/66 |
| 2013/0076137 A1 | 3/2013 | Murtha et al. | | |
| 2014/0152099 A1* | 6/2014 | Boyd | .................... | H02J 7/0013 |
| | | | | 320/134 |
| 2014/0167506 A1* | 6/2014 | Wood | .................. | H02J 7/00308 |
| | | | | 307/25 |
| 2014/0344610 A1 | 11/2014 | Ross | | |
| 2015/0116945 A1* | 4/2015 | Minamio | ................ | H01L 25/07 |
| | | | | 361/709 |
| 2016/0006992 A1* | 1/2016 | Roberts | .................. | H04N 23/63 |
| | | | | 348/113 |
| 2016/0015167 A1* | 1/2016 | Abu-Akel | ............... | A47B 21/02 |
| | | | | 248/161 |
| 2017/0126054 A1* | 5/2017 | White | ..................... | H02J 9/061 |
| 2018/0233948 A1* | 8/2018 | Destenaves | ........... | G06F 1/1635 |
| 2020/0031480 A1 | 1/2020 | Baig | | |
| 2020/0075972 A1 | 3/2020 | Jorgenson | | |
| 2020/0076700 A1* | 3/2020 | White | .................... | H01R 25/16 |
| 2020/0086748 A1 | 3/2020 | Bolger | | |
| 2020/0287392 A1* | 9/2020 | Cooper | .................. | H02J 7/0042 |
| 2021/0384729 A1* | 12/2021 | Thomas, III | ........ | H02J 7/00714 |
| 2022/0085618 A1* | 3/2022 | Alobaidi | ............... | H02J 1/001 |
| 2023/0198269 A1* | 6/2023 | Alobaidi | ................ | G06F 1/188 |
| | | | | 307/19 |

OTHER PUBLICATIONS

EP App. No. 18854454.8-1202/3679637, Extended European Search Report, May 3, 2021.

* cited by examiner

POWER SYSTEMS AND METHODS OF USING THE SAME TO DELIVER POWER

PRIORITY

The present application is related to, and claims the priority benefit of, and is a U.S. Continuation patent application of, U.S. patent application Ser. No. 17/535,972, filed on Nov. 26, 2021, and issued on Feb. 21, 2023 as U.S. Pat. No. 11,588,335, which is related to, and claims the priority benefit of, and is a U.S. Continuation patent application of, U.S. patent application Ser. No. 16/645,766, filed on Mar. 9, 2020, and issued on Dec. 28, 2021 as U.S. Pat. No. 11,211,802, and was the U.S. National Stage application of Patent Cooperation Treaty application Serial No. PCT/US2018/050038 filed on Sep. 7, 2018, which is related to, and claims the priority benefit of, U.S. Provisional Patent Application Ser. No. 62/555,279, filed Sep. 7, 2017, the contents of which are incorporated herein directly and by reference in their entirety.

BACKGROUND

In late 1990's to the early 2000's, mobile medical workstations (carts) were used to make computers portable so that nurses could document care at the patient bedside instead of transcribing notes. Early (and perhaps the first) mobile workstation and battery systems were referenced within U.S. Pat. Nos. 6,492,220 and 7,222,031. These patents reference a basic workstation with a basic rechargeable battery. The most commercially available battery at that time was a sealed lead acid (SLA), which were relatively inexpensive and mass produced for the automobile market. The characteristics of the SLA chemistry provide great 'cranking power' to start a car, for example, but does not provide a long life when it is discharged over a long period, such as used in medical facilities. The SLA battery would only provide 6-8 months of useful life before it needed to be replaced.

The advancements in battery technology provided opportunities for mobile workstation power systems to improve efficiency and functionality. Nickel-metal hydride (NiMH) batteries where a good replacement for SLA as they offered longer life and faster charging. By 2010-2013, the cost of lithium-ion (Li-Ion) batteries fell to a level that compelled the mobile workstation market to adopt Li-Ion chemistry.

Up until 2008, mobile workstation batteries were 'fixed' mounted within a housing mounted to the bottom of a workstation. The 'fixed' battery forced the user to take the cart out of service in-order to charge which created a hassle because nurses forget or unwilling to plug-in the cart to recharge the batteries. The number one point of failure with workstations is the battery because the user fails to plug-in. Downtime due to 'dead batteries' forces hospitals to buy more carts which creates budget and other problems. In 2008, Stinger Medical, now owned by Enovate medical, developed and patented the first hot swappable battery system whereby a removable battery is placed in a holster and communicates with a small backup battery at the bottom of the cart to provide continuous power when the removable battery is removed. The user has then had two minutes to replace the removable battery with a second battery that was charged remotely on a wall charger. This system was patented in 2008 (U.S. Pat. No. 7,800,255).

However, and even as battery technologies have improved, medical carts (workstations) still generally suffer from inefficient, interrupted, unreliable, and short-lived power delivery. Said power systems also all rely on fans to cool the batteries, noting that the air movement over dirty components, especially within a hospital or other medical setting, could contaminate the air and potentially cause or contribute to hospital acquired infections.

In view of the same, a power system configured to deliver efficient, uninterrupted, and reliable power, using one or more hot swappable long life batteries that are efficiently charged, without the added risk of contaminating a medical environment, would be well received in the marketplace.

BRIEF SUMMARY

The present disclosure includes disclosure of a power system, comprising a housing capable of attaching to a workstation; one or more cradles or mounting fixtures to receive at least one energy storage device; electronic circuitry to communicate status of the at least one energy storage device, state of charge of the at least one energy storage device, and/or overall health of the at least one energy storage device; and one or more electrical connectors to allow the at least one energy storage device to charge and/or discharge and communicate with the electronic circuitry; said housing having an internal power supply and charge circuitry; said power supply capable of receiving input power from an external AC or DC power source; wherein the power system is configured to deliver power from at least one of the at least one storage device, the internal power supply, and/or the external AC or DC power source to the workstation.

The present disclosure includes disclosure of a power system, wherein the workstation is selected from the group consisting of a portable workstation and a stationary workstation.

The present disclosure includes disclosure of a power system, wherein the at least one energy storage device is selected from the group consisting of a battery, a capacitor, and a fuel cell.

The present disclosure includes disclosure of a power system, wherein the electronic circuitry and/or the charge circuitry is/are configured to allow the at least one energy storage device to communicate state of charge of the at least one energy storage device and/or overall health of the at least one energy storage device.

The present disclosure includes disclosure of a power system, wherein the electronic circuitry and/or the charge circuitry is/are configured to communicate and/or control energy output of the at least one energy storage device.

The present disclosure includes disclosure of a power system, wherein the electronic circuitry and/or the charge circuitry is/are configured to prioritize charge or discharge of the at least one energy storage device.

The present disclosure includes disclosure of a power system, further comprising a backup energy storage device mounted and connected within said housing to allow for continuity of power in the absence of the at least one energy storage device and/or the external AC or DC power source.

The present disclosure includes disclosure of a power system, wherein the electronic circuitry and/or the charge circuitry is/are configured to recognize an absence of the at least one energy storage device and communicate the same to allow power from the backup energy storage device to provide output power to workstation equipment requiring continuity of power.

The present disclosure includes disclosure of a power system, wherein the electronic circuitry and/or the charge circuitry is/are configured to recognize a depleted power level of the at least one energy storage device and communicate the same to allow power from the backup energy storage device to provide output power to workstation equipment requiring continuity of power.

The present disclosure includes disclosure of a power system, wherein the electronic circuitry and/or the charge circuitry is/are configured to recognize an absence of the external AC or DC power source and communicate the same to allow power from the backup energy storage device to provide output power to workstation equipment requiring continuity of power.

The present disclosure includes disclosure of a power system, wherein output power voltage of the power system is programmable to match a required voltage of a workstation device being powered.

The present disclosure includes disclosure of a power system, wherein the electronic circuitry and/or the charge circuitry comprises an internal and/or external inverter to match local power and mechanical mating plug requirements.

The present disclosure includes disclosure of a power system, wherein data from the power system can be communicated to the workstation and/or an external device separate from the workstation.

The present disclosure includes disclosure of a power system, wherein the data is selected from the group consisting of a condition of the at least one energy storage device, health of at least one energy storage device, and a temperature of the power system.

The present disclosure includes disclosure of a power system, wherein the external device is selected from the group consisting of a desktop computer, a laptop computer, a smartphone, a personal digital assistant, and a tablet.

The present disclosure includes disclosure of a power system, configured to use a graphical user interface element to communicate data relating to the power system, the graphical user interface element selected from the group consisting of one or more graphics, one or more emoji, one or more scales, and one or more clocks.

The present disclosure includes disclosure of a power system, configured for operation without requiring a cooling fan or other objects or devices intended to move air for the purposes of cooling components of the power system that produce and/or are effected by heat, so that the power system operates within specified thermal tolerances.

The present disclosure includes disclosure of a power system, further comprising one or more heat sinks in thermal communication with one or more components of the power system.

The present disclosure includes disclosure of a power system, wherein the housing is enclosed or at least partially surrounded by an external case.

The present disclosure includes disclosure of a power system, further comprising a processor in communication with a storage medium having software stored therein or thereon, the processor configured to operate based upon instructions from the software to operate the power system so to charge the at least one at least one energy storage device.

The present disclosure includes disclosure of a power system, further comprising a processor in communication with a storage medium having software stored therein or thereon, the processor configured to operate based upon instructions from the software to operate the power system so to deliver power from the at least one energy storage device to the workstation.

The present disclosure includes disclosure of a power system, further comprising a processor in communication with a storage medium having software stored therein or thereon, the processor configured to operate based upon instructions from the software to operate the power system so to regulate temperature of the power system.

The present disclosure includes disclosure of a power system, further comprising a processor in communication with a storage medium having software stored therein or thereon, the processor configured to operate based upon instructions from the software to operate the power system so to obtain and transmit data regarding the power system.

The present disclosure includes disclosure of a power system, further configured to deliver power from at least one of the at least one storage device, the internal power supply, and/or the external AC or DC power source to an external device separate from the workstation.

The present disclosure includes disclosure of a power system, wherein the external device is selected from the group consisting of a computer, a monitor, a scanner, a printer, a motor, and an actuator.

The present disclosure includes disclosure of a power system, wherein the internal power supply is programmed to perform a desired/proper charge algorithm or charge protocol so to ensure safety and longevity of the at least one energy storage device charged using the internal power supply.

The present disclosure includes disclosure of a power system, wherein the internal power supply is programmed to manage a state of charge of the at least one energy storage device in order to match a power requirement of the workstation.

The present disclosure includes disclosure of a power system, wherein the internal power supply is programmed to manage a state of charge of the at least one energy storage device in order to match a power requirement of the external device.

The present disclosure includes disclosure of a power system, further comprising the workstation.

The present disclosure includes disclosure of a method, comprising operating a power system of the present disclosure to deliver power to the workstation.

The present disclosure includes disclosure of a workstation, comprising a power system of the present disclosure.

The present disclosure includes disclosure of a workstation, comprising a power system of the present disclosure and at least one external device.

The present disclosure includes disclosure of a workstation, comprising a power system, comprising a housing capable of attaching to a workstation; one or more cradles or mounting fixtures to receive at least one energy storage device; electronic circuitry to communicate status of the at least one energy storage device, state of charge of the at least one energy storage device, and/or overall health of the at least one energy storage device; and one or more electrical connectors to allow the at least one energy storage device to charge and/or discharge and communicate with the electronic circuitry; said housing having an internal power supply and charge circuitry; said power supply capable of receiving input power from an external AC or DC power source; and wherein the power system is configured to deliver power from at least one of the at least one storage device, the internal power supply, and/or the external AC or DC power source to the workstation; and at least one external device.

The present disclosure includes disclosure of a workstation, wherein the at least one external device is selected from the group consisting of a computer, a monitor, a scanner, a printer, a motor, and an actuator.

The present disclosure includes disclosure of a workstation, configured as a medical cart.

The present disclosure includes disclosure of a method, comprising operating a power system, the power system comprising a housing capable of attaching to a workstation; one or more cradles or mounting fixtures to receive at least one energy storage device; electronic circuitry to communicate status of the at least one energy storage device, state of charge of the at least one energy storage device, and/or overall health of the at least one energy storage device; and one or more electrical connectors to allow the at least one energy storage device to charge and/or discharge and communicate with the electronic circuitry; said housing having an internal power supply and charge circuitry; said power supply capable of receiving input power from an external AC or DC power source; and wherein the power system is configured to deliver power from at least one of the at least one storage device, the internal power supply, and/or the external AC or DC power source to the workstation; wherein the operating step is performed to deliver power to the workstation and/or to an external device separate from the workstation so as to facilitate operation of the workstation and/or the external device.

The present disclosure includes disclosure of a method, further comprising the step of programming the internal power supply so that it can perform a desired/proper charge algorithm or charge protocol so to ensure safety and longevity of the at least one energy storage device charged using the internal power supply.

The present disclosure includes disclosure of a method, further comprising the step of programming the internal power supply so that it can manage a state of charge of the at least one energy storage device in order to match a power requirement of the workstation.

The present disclosure includes disclosure of a method, further comprising the step of programming the internal power supply so that it can manage a state of charge of the at least one energy storage device in order to match a power requirement of the external device.

The present disclosure includes disclosure of a power system, comprising one or more of the following: a housing capable of attaching to workstations and/or other portable and non-portable, mobile and/or stationary fixtures, herein workstations; one or more cradles or mounting fixtures to receive a single (or plurality of) battery and/or other similar energy storage device such as but not limited to supercapacitors and fuel cells, herein referred to as "battery" or "batteries"; a removable or non-removable (mounted) battery; electronic circuitry to communicate battery status, state of charge and/or overall health; one or more electrical connectors to allow the battery or other energy storage device to charge and/or discharge and communicate with circuitry; said housing having built-in power supply and charge circuitry; and said power supply capable of receiving input power from line-cord and/or induction/inductive charging from external AC or DC power source.

The present disclosure includes disclosure of a power system, wherein the electronic circuitry and/or the charge circuitry is/are configured to allow said battery and/or energy storage device to communicate state of charge, battery health and other system related data; and/or communicate and/or control battery output; and/or prioritize battery charge or discharge.

The present disclosure includes disclosure of a power system, further comprising a backup battery and/or energy storage device mounted and connected within said housing to allow for continuity of power in the absence of said battery or batteries and/or an AC or DC external power source.

The present disclosure includes disclosure of a power system, wherein the electronic circuitry and/or the charge circuitry is/are configured to recognize the absence of a battery or batteries (absence of energy/power storage devices), depleted power levels of the same, and/or the absence of an external AC or DC power source; and communicate said condition to allow power from internal backup battery (backup energy storage devices) to provide output power to workstation equipment requiring continuity of power.

The present disclosure includes disclosure of a power system, wherein output power voltage is uniquely programmable to match the required voltage of the device being powered.

The present disclosure includes disclosure of a power system, wherein the electronic circuitry and/or the charge circuitry comprises an internal and/or external inverter to match local power and mechanical mating plug requirements.

The present disclosure includes disclosure of a power system, wherein data from said power system, including, but not limited to, battery condition, health, system temperature and/or other parameters can be communicated wired or wirelessly to an external device/interface, such as a desktop computer, laptop computer, smartphone, personal digital assistant (PDA), tablet, or other electronic device, which may be separate from, or comprise part of, a workstation.

The present disclosure includes disclosure of a power system, wherein various user selectable graphical user interface (GUI) elements are used, including, but not limited to, one or more graphics, emoji, scales, clocks, etc., and/or other methods of communicating power system information, including state of battery charge.

The present disclosure includes disclosure of a power system, configured for operation without the need/use of a cooling fan or other objects or devices intended to move air for the purposes of cooling components of the power system components that produce and/or are effected by heat, so that the power system operates within thermal tolerances outlined in certifying agency requirements, such as, but not limited to, IEC 60601-1.

The present disclosure includes disclosure of a power system, further comprising one or more heat sinks in thermal communication with one or more components of the power system.

The present disclosure includes disclosure of a power system, wherein the housing is enclosed or at least partially surrounded by an external case.

The present disclosure includes disclosure of a power system, further comprising a processor in communication with a storage medium having software stored therein or thereon, the processor configured to operate based upon instructions from the software to accomplish the various charging, power delivery, temperature regulation, and information/data communication as referenced herein.

The present disclosure also includes disclosure of a method for providing electrical power to a computer, monitor(s), scanners, printers, motors, actuators and other equipment requiring power (exemplary external devices/interfaces, which may comprise or be separate from workstation (s)) using a power system to perform its intended function.

The present disclosure also includes disclosure of a method for providing electrical power, comprising the step of programming an internal power supply to perform a desired/proper charge algorithm or charge protocol as to ensure safety and longevity of one or more energy/power storage devices charged using said power supply is maximized.

The present disclosure also includes disclosure of a method for providing electrical power, comprising the step of programming internal power supply to manage the state of charge of the one or more energy/power storage devices mounted or fixed to the power system in order to match the user's desired workflow requirements or to generally match the power needs of the external devices/interfaces receiving power therefrom.

The present disclosure includes disclosure of power systems, as shown and/or described herein.

The present disclosure includes disclosure of methods of delivering power using power systems, as shown and/or described herein.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein.

Figure 1:
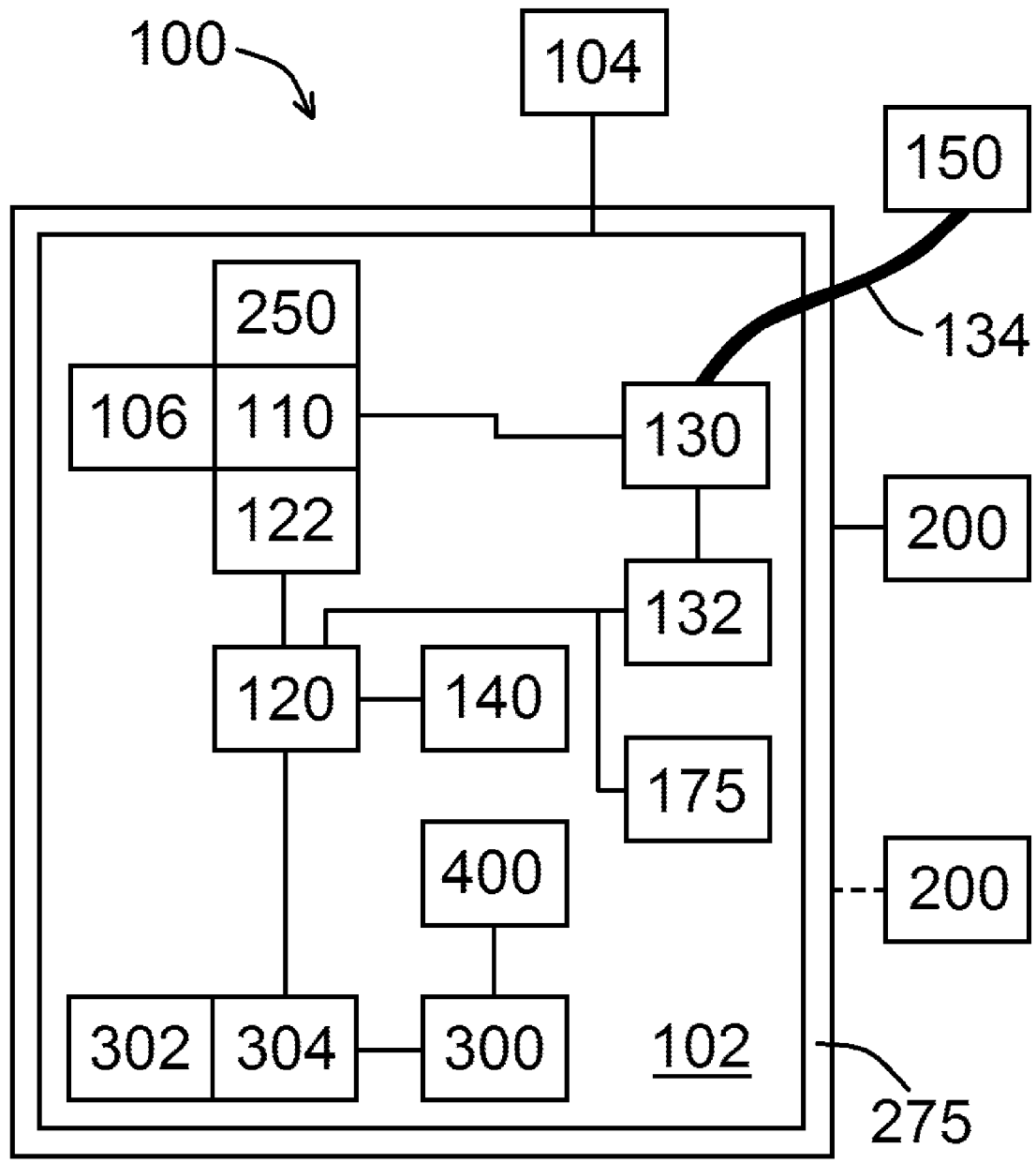
FIG. 1 shows a block diagram of components of a power system and items coupled thereto and in communication therewith, according to an exemplary embodiment of the present disclosure.

An overview of the features, functions and/or configurations of the components depicted in the various figures will now be presented. It should be appreciated that not all of the features of the components of the figures are necessarily described. Some of these non-discussed features, such as various couplers, etc., as well as discussed features are inherent from the figures themselves. Other non-discussed features may be inherent in component geometry and/or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

An exemplary power system of the present disclosure is shown in FIG. 1. As shown therein, an exemplary power system 100 of the present disclosure comprises a housing 102 configured to and capable of coupling (attaching) to a workstation and/or other portable and non-portable, mobile, and/or stationary fixtures, including, but not limited to, medical carts as referenced herein. The term workstation 104, as used herein, refers to said workstations, portable, non-portable, mobile, and/or stationary fixtures. Power systems 100 of the present disclosure can further comprise one or more mounting structures 106, which may also be referred to herein as one or more cradles, whereby said mounting structure(s) 106 is/are configured to receive one or more energy/power storage devices 110, such as batteries, capacitors, and/or fuel cells (all exemplary energy/power storage devices 110). As such, exemplary power systems 100 of the present disclosure can comprise one or more energy/power storage devices 110.

Power systems 100 of the present disclosure further comprise electronic circuitry 120 configured to facilitate communication of battery status, state of charge, and/or overall battery health. Said electronic circuitry can comprise, or be coupled to, an electrical connector 122 configured to electrically connect/couple to one or more energy/power storage devices 110 of the present disclosure. Said connectors 122, along with circuitry 120, allow batteries (energy/power storage devices 110) to charge and/or discharge as desired/instructed.

Housings 102 of the present disclosure can further comprise, or be electrically connected/coupled to, a power supply 130 (such as a charger, for example) having its own charge circuitry 132 (or coupled to said charge circuitry 132). Power supplies 130 of the present disclosure are configured to receive input power from a power cord 134 (also referred to herein as a line-cord) connected to an alternating current (AC) or direct current (DC) power source 150, and/or configured to receive input power from an external AC or DC power source 150 via induction charging.

Circuitry 120 and/or charge circuitry 132 of the present disclosure can be configured to communicate state of charge, battery health and other system related data from said energy/power storage devices 110, communicate and/or control output of said energy/power storage devices 110, and/or prioritize charge or discharge of energy/power storage devices 110.

Exemplary power systems 100 of the present disclosure may further comprise one or more backup energy storage devices 175, such as one or more other energy/power storage devices 110, whereby said backup energy storage devices 175 are positioned within and/or coupled to housing 102 and are configured to allow for continuity of power in the absence of energy/power storage devices 110 and/or an external AC or DC power source 150. For example, power systems 100 of the present disclosure can be configured to deliver power to a workstation 104 a) by way of a power cord 134 connected to an external AC or DC power source 150, b) by way of induction charging of one or more energy/power storage devices 110 using an external AC or DC power source 150, c) by way of one or more energy/power storage devices 110, d) by way of one or more backup energy storage devices 175, or e) using a combination of any of a), b), c), and/or d).

In view of the foregoing, circuitry 120 and/or charge circuitry 132 of the present disclosure can be configured to recognize the absence of a battery or batteries (absence of energy/power storage devices 110), depleted power levels of the same, and/or the absence of an external AC or DC power source 150, and to communicate said condition to allow power from internal backup battery (backup energy storage devices 175) to provide output power to workstation 104 equipment requiring continuity of power.

Output power voltage(s), from energy/power storage devices 110, external AC or DC power sources 150, and/or backup energy storage devices 175, can be programmable so to match the required voltage(s) of the workstations 104 being powered. Circuitry 120 and/or charge circuitry 132 of the present disclosure may comprise an internal and/or external inverter 140 to match local power and mechanical mating plug requirements.

Figure 3:
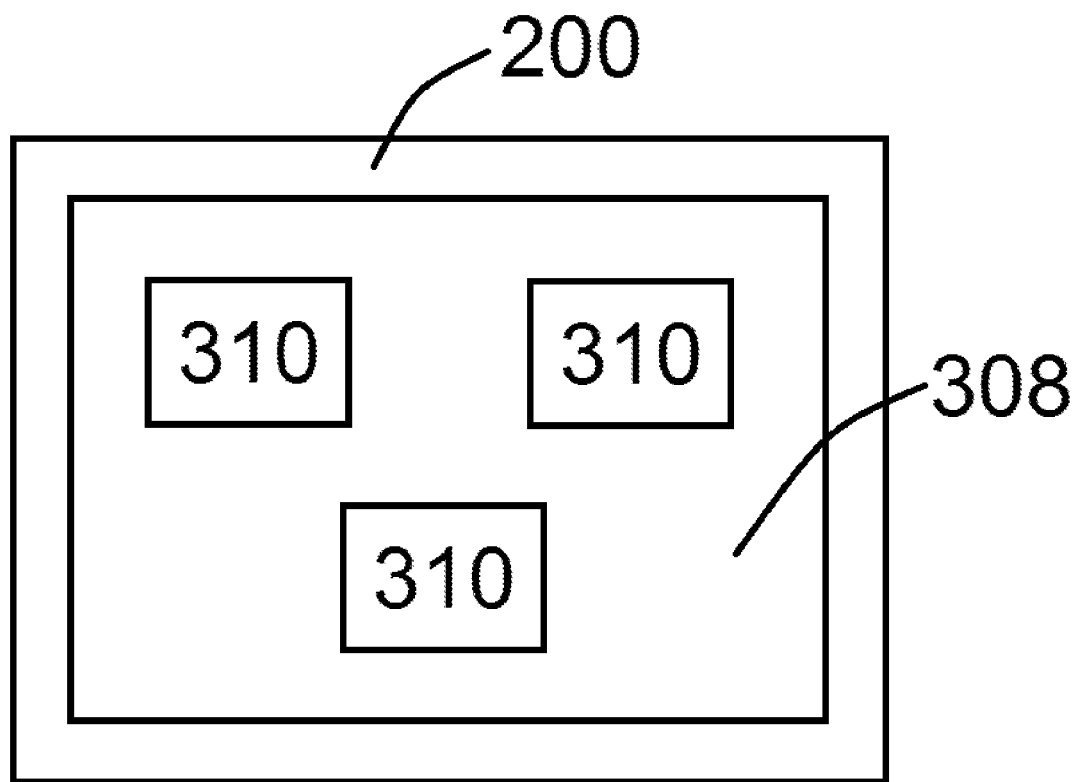
FIG. 3 shows a display of an external device/interface having GUI elements displayed thereon, according to an exemplary embodiment of the present disclosure.

In various embodiments of power systems 100 of the present disclosure, data from said power systems 100, including, but not limited to, battery (energy/power storage devices 110 and/or backup energy storage devices 175) condition, health, system temperature and/or other parameters can be communicated to an external devices/interfaces 200, such as a desktop computer, laptop computer, smartphone, personal digital assistant (PDA), tablet, or other electronic device, which may be separate from, or comprise part of, a workstation 104. In various embodiments, various graphical user interface (GUI) elements may be used, including, but not limited to, one or more graphics, emoji, scales, clocks, etc. (collectively GUI elements 310), such as shown in FIG. 3, and/or other methods of communicating power system 100 information, including state of battery charge. Said GUI elements 310 can be displayed on a screen 308 of an external device/interface 200, for example, such as shown in FIG. 3.

The present disclosure also includes disclosure of methods for providing electrical power to a computer, monitor(s), scanners, printers, motors, actuators and other equipment requiring power (exemplary external devices/interfaces 200, which may comprise or be separate from workstation(s) 104) from a power system to perform its intended function. In at least one embodiment of said method, the method comprises the step of programming the internal power supply 130 to perform a desired/proper charge algorithm or charge protocol as to ensure safety and longevity of the energy/power storage devices 110 charged using said power supply is maximized. In at least one embodiment of said method, the method comprises the step of programming the internal power supply 130 to manage the state of charge of the one or more energy/power storage devices 110 mounted or fixed to the power system 100 in order to match the user's desired workflow requirements or to generally match the power needs of the external devices/interfaces 200 receiving power therefrom.

It is well understood that the use of cooling fans within an operational environment of a power system 100 is not ideal as such a cooling fan is a point of failure, collecting airborne substances such as dust and dirt, and may present an infection control hazard within a hospital environment. It is understood that the cooling fan is a requirement of power systems currently on the market to control the system temperature to prevent safety hazard and/or to pass the thermal requirements of agencies that test/certify power systems for use.

However, the present disclosure includes disclosure of power systems that eliminate the need/use of a cooling fan or other objects or devices intended to move air for the purposes of cooling power system 100 components that produce and/or are effected by heat while operating within the thermal tolerances outlined in certifying agency requirements, such as, but not limited to, IEC 60601-1

Power system 100 architecture and design is a critical component in enabling fanless charging. To accomplish the same, internal heatsinks 250, in thermal communication with one or more components of power systems 100 of the present disclosure, are used, which are configured to transfer heat from said power system components. Heat sinks 250 can then transfer heat to an external case 275 surrounding at least part of housing 102, as desired/necessary. Proprietary high efficiency AC/DC, DC/DC and power switching systems are therefore incorporated within power systems 100 to help reduce system heat. Said power switching systems can comprise or be portions of energy/power storage devices 110, electronic circuitry 120, electrical connectors 122, power supplies 130, charge circuitry 132, internal and/or external inverter, and/or backup energy storage device 175.

Firmware (software) is also an important component in charging since it can be used to monitor the temperature of the power system 100 and/or components thereof and reduce the charge current, for example, if temperature reaches defined set points. Said firmware (software 302) can be stored within a storage medium 304 (such as flash memory, a hard drive, etc., configured to store software 302) and use a defined temperature/current profile for the power system 100, so to maintain temperatures within a desired range while providing power from power system 100 as required/desired within said temperature range. Hysteresis can be used and implemented within exemplary power systems 100 to prevent constant power adjustment time and temperature. A processor 300 (such a microprocessor), in communication with storage medium 304, can operate based upon instructions from software 302, to accomplish the various charging, power delivery, temperature regulation, and information/data communication as referenced herein.

Figure 2:
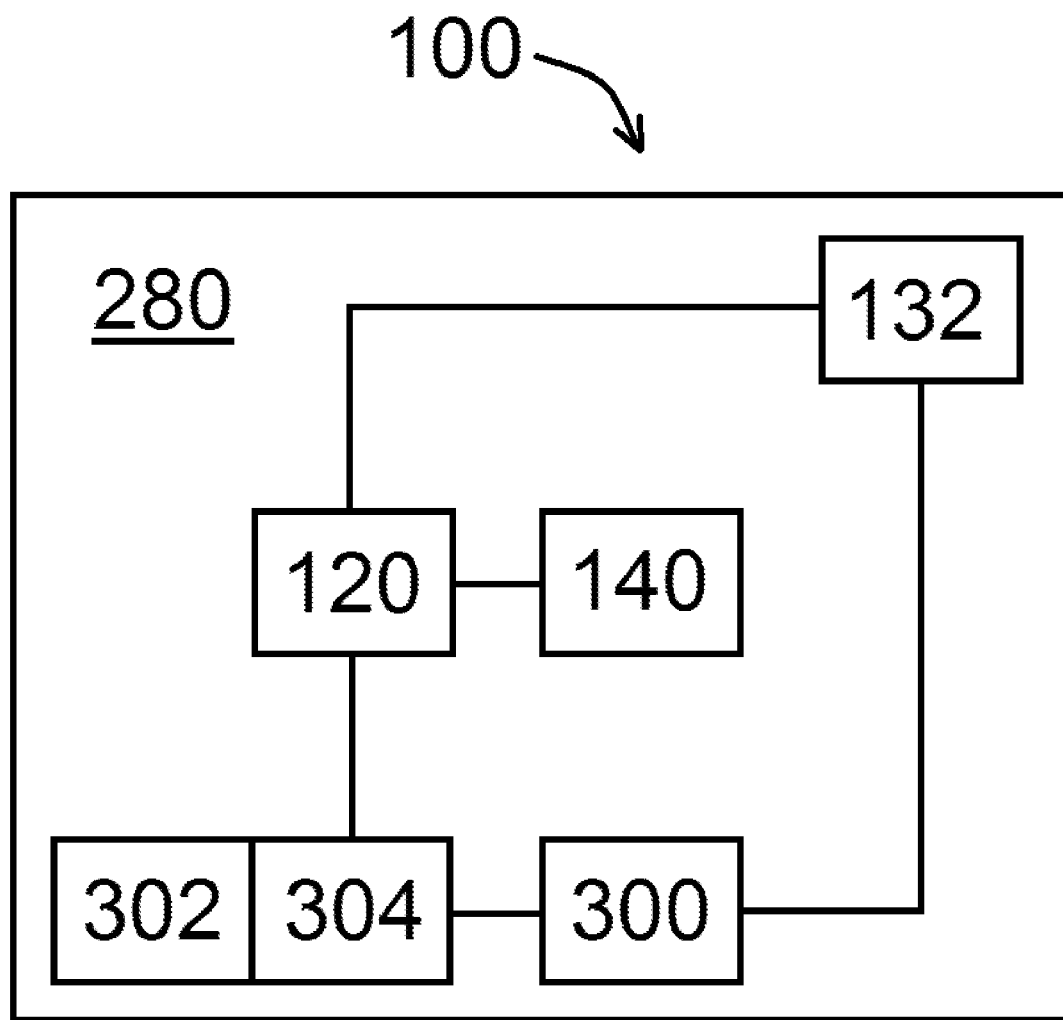
FIG. 2 shows a block component diagram of a printed circuit board (PCB) having components coupled thereto and/or embedded therein, according to an exemplary embodiment of the present disclosure.

Delivery of power from power systems 100 of the present disclosure to workstations 104 and/or other external devices/interfaces can be maximized, whereby the power is determined by AC/DC utilized, the electronic circuitry 120 or charge circuitry 132 (such as copper) upon a printed circuit board (PCB) 280, as shown in FIG. 2, along with the energy/power storage devices 110 themselves. Components of power system 100, such as power supply 130, charge circuitry 132, internal and/or external inverter 140, etc., can be configured to communicate with energy/power storage devices 110 via serial communication to ensure overcharge of said energy/power storage devices 110 does not occur. In addition, exemplary power systems 100 of the present disclosure, as referenced herein, can monitor temperature and voltage levels to ensure proper cutoff occurs of the power charging the energy/power storage devices 110, such as by way of power supply 130. Current can be reduced based upon voltage of energy/power storage devices 110, if needed, for optimal charging and power delivery. Cell chemistry and energy/power storage devices 110 configuration and assembly are also important to ensure maximum charge current. For example, if the individual or collective energy/power storage devices 110 or cells thereof cannot handle a set 20A (or higher or lower) charge rate, for example, then the power system 100 will use the maximum rate possible that is communicated to the power system 100 from the energy/power storage devices 110 themselves via serial communication. For example, an A123 battery pack is capable of only 12.5 A rate, so it would regulate charging to 12.5 A instead of 20 A, in the aforementioned example, as desired/required.

Regarding variable DC output, exemplary power systems 100 of the present disclosure, as referenced herein, can utilize digital potentiometers 400 controlled by a microprocessor (processor 300) to adjust a feedback control circuit (electric circuit 120 and/or charge circuit 132) in the DC buck/boost circuits. Exemplary power systems 100 allow for end user configuration of the DC output based upon using a SW utility to set limits, or can be set via power system 100 configuration during workstation 104 assembly. The DC output voltage levels can monitor different power system 100 parameters to adjust the DC output level, with said parameters including, for example, AC power connected, DC overload condition, and DC current output. FW can monitor the parameters and adjust the voltage output via the buck/boost control circuits.

Exemplary power systems 100 of the present disclosure can implement a multivariate analysis including, but not limited to, a combination of cell chemistry, voltage, current, temperature, user runtime requirements, and the like, to determine which multi-rate charge routine is utilized to return said battery packs (energy/power storage devices 110) to a 100% state of charge, ensuring safety and utility are maximized.

Multi-rate charging, within the scope of the present disclosure, can be described as follows. Constant voltage (CV) type charging can be used, for example, with various low power systems, medical systems, and industrial systems. A corresponding charge algorithm can operate independently from the state of charge. At the connection of the energy/power storage device 110, for example, a charger output voltage can be set (such as setting an output voltage of a power supply 130 of the present disclosure), and power system 100 can charge the energy/power storage device 110 at a constant rate until the voltage of the energy/power storage device 110 equals the set charger output voltage. As the voltage differential between the charger and the energy/power storage device 110 reduces, charge current reduces, and the charge can terminate after, for example, the charge current is less than a charge termination setpoint for a specified charge termination time. Temperature of power system 100 and/or temperature of energy/power storage device 110 can impact charge current (such as for safety), such as when the energy/power storage device 110 temperature exceeds a maximum temperature setpoint, the charge can be terminated. When the charging system temperature exceeds a high temperature setpoint, for example, the charge current is or can be reduced to allow power system 100 and/or energy/power storage device 110 to cool and safely operate. When the charging system exceeds a maximum setpoint, the charge can be terminated to prevent damage to the power system 100 and/or the energy/power storage device 110, also such as for safety. As the charger voltage and the battery pack (energy/power storage device 110) differential is reduced over time, the charge current can slowly reduce over time as well when this multi-step charging mechanism is used.

Such an exemplary charging procedure differs from step charging, for example, whereby a system charging current is set at the beginning of a charge and such that the battery charges until a predetermined state of charge (such as 60% to 80%) or voltage is reached, and once that setpoint is reached, the current is "stepped down" to allow the battery to charge at a lower rate, with the current step and number of steps typically determined by software within the charging device.

Energy/power storage devices 110 of the present disclosure are hot swappable, meaning that while power system 100 is used to deliver power to a workstation 104, for example, one or more energy/power storage devices 110 can be removed from power system 110 and, if desired, replaced with a replacement energy/power storage device 110. For example, various embodiments of power systems 100 of the present disclosure can incorporate one, two, three, four, or more energy/power storage devices 110 therein. In embodiments having one energy/power storage device 110, it can be removed while power system 100 is delivering power, as backup energy storage device 175 can be used to deliver power during the replacement of said energy/power storage device 110. In power system 100 embodiments having two or more energy/power storage devices 110, one or more energy/power storage device 110 can be removed while power system 100 is delivering power, with said power delivered from any remaining energy/power storage devices 110 and/or backup energy storage device 175. While power system 100 is plugged into AC or DC power source 150, or otherwise in a mode for charging using AC or DC power source 150 (such as by induction charging), energy/power storage devices 110 and/or backup energy storage device 175 can be charged using AC or DC power source 150, while delivering power to a workstation 104, for example, as may be desired.

Power systems 100 of the present disclosure are novel over existing power systems in the marketplace as they a) can be hot swappable, a noted above, b) can use a unique method of charging, as noted herein, c) can use programmable DC outputs, as referenced herein, and d) can operate as desired, namely to deliver a desired amount of power within a desired temperature range, without the use of a fan or other air circulating element.

As referenced herein, the present disclosure also includes disclosure of a workstation 104 having a power system 100 of the present disclosure, whereby the power system 100 is configured to provide power to workstation 104, such as, for example, to power a computer, monitor(s), scanners, printers, motors, actuators and other equipment requiring power (exemplary external devices/interfaces 200, which may comprise or be separate from workstation(s) 104, as referenced herein) to perform its intended function(s).

While various embodiments of devices for power systems and methods for using the same to deliver power have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A power system comprising:
   a housing configured to attach to a workstation,
   the housing further comprising a mounting structure configured to receive an energy storage device;
   a backup energy storage device positioned within the housing;
   the power system configured to deliver an output power to the workstation from the energy storage device and the backup energy storage device;
   charge circuitry connected to a backup energy storage device so the backup energy storage device can be charged when the power system is plugged into an external AC or DC power source; and electronic circuitry configured to recognize the absence of the energy storage device or a depleted energy power level of the energy storage device, and to communicate said condition so that backup energy storage device is used to provide the output power to the workstation so as to provide continuity of power.

2. The power system of claim 1, wherein the energy storage device is removable while the power system is delivering power to the workstation and replaceable with a replacement energy storage device.

3. The power system of claim 1, further comprising an internal inverter to match the power requirements of the workstation.

4. The power system of claim 3, wherein the power system utilizes digital potentiometers controlled by a microprocessor to adjust a feedback control circuit to provide a variable DC output power.

5. The power system of claim 3, wherein the current of the output power can be reduced and the voltage of the output power is programmable to match a required voltage of the workstation.

6. The power system of claim 1, wherein there is no cooling fan or other objects or devices intended to move air for the purposes of cooling the power system components.

7. The power system of claim 1, further comprising a heatsink in thermal communication with one or more components of the power system and configured to transfer heat from said one or more components to an external case surrounding at least part of the housing.

8. The power system of claim 1 wherein the energy storage device is charged by induction using the external AC or DC power source.

9. A power system comprising:
a housing configured to attach to a workstation,
the housing further comprising a mounting structure configured to receive an energy storage device;
the housing further comprising or being connected to a power supply that receives input power from an external AC or DC power source;
the power system configured to deliver an output power to the workstation from the power supply and the energy storage device;
a backup energy storage device positioned within the housing and configured to be charged when the power system is plugged into an external AC or DC power source; and
wherein the output power is programmable to match the power requirements of the workstation being powered.

10. The power system of claim 9, wherein the power system utilizes digital potentiometers controlled by a microprocessor to adjust a feedback control circuit to provide a variable DC output power.

11. The power system of claim 9, wherein the power supply is programmed to manage a state of charge of the at least one energy storage device in order to match a power requirement of the workstation.

12. The power system of claim 11, wherein the energy storage device is configured to be charged from the power source while delivering output power to the workstation while being charged.

13. The power system of claim 9, wherein there is no cooling fan or other objects or devices intended to move air for the purposes of cooling the power system components.

14. A power system comprising:
a housing configured to attach to a workstation,
the housing further comprising a mounting structure configured to receive an energy storage device;
the housing further comprising or being connected to a power supply that receives input power from an external AC or DC power source;
a backup energy storage device positioned within the housing;
the power system configured to deliver an output power to the workstation from the energy storage device, the power supply, and the backup energy storage device;
charge circuitry connected to the backup energy storage device so the backup energy storage device can be charged when the power system is plugged into the external AC or DC power source; and
electronic circuitry configured to recognize the absence of the energy storage device, a depleted energy power level of the energy storage device, and the absence of the external AC or DC power source, and to communicate said condition so that backup energy storage device is used to provide the output power to the workstation so as to provide continuity of power.

15. The power system of claim 14, wherein the power supply is configured to charge the energy storage device via multi-rate charging, wherein multi-rate charging comprises:
setting an output voltage of the power supply upon initial connection of the energy storage device and charging the energy storage device until the voltage of the energy storage device equals the set output voltage of the power supply;
wherein a charge current from the power supply reduces as the voltage differential between the power supply and the energy storage device reduces; and
the charge terminates after the charge current is less than a charge termination set point for a specified charge termination time.

16. The power system of claim 15, wherein the charge current slowly reduces over time as the voltage differential of the power supply voltage and the energy storage device is reduced over time.

17. The power system of claim 14 wherein the electronic circuitry further comprises an inverter to match the power requirements of the workstation.

18. The power system of claim 17, wherein the power system utilizes digital potentiometers controlled by a microprocessor to adjust a feedback control circuit to provide a variable DC output power.

19. The power system of claim 18, configured to monitor power system parameters and to adjust the variable DC output power based on the monitored parameters, wherein the power system parameters comprise AC power connected, DC overload condition, and DC current output.

20. The power system of claim 14, wherein the energy storage device and the backup energy storage device are configured to be charged from the power source while delivering output power to the workstation.

* * * * *